US012590769B2

(12) United States Patent

Lombardo et al.

(10) Patent No.: US 12,590,769 B2

(45) Date of Patent: Mar. 31, 2026

(54) HEAT EXCHANGER WITH ALUMINUM ALLOY CLAD TUBE AND METHOD OF MANUFACTURE

(71) Applicant: Carrier Corporation, Palm Beach Gardens, FL (US)

(72) Inventors: Mary Teresa Lombardo, Windsor, CT (US); Ruoshuang Huang, Farmington, CT (US); Jefferi J. Covington, Aldwinsville, NY (US); Matthew Patterson, East Syracuse, NY (US); Anais Espinal, Burlington, MA (US); Mark R. Jaworowski, Sarasota, FL (US); Aaron T. Nardi, East Granby, CT (US); Catherine Thibaud, Cork (IE); Tobias H. Sienel, Baldwinsville, NY (US); Luis Felipe Avila, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/751,758

(22) Filed: Jun. 24, 2024

(65) Prior Publication Data

US 2024/0344784 A1 Oct. 17, 2024

Related U.S. Application Data

(63) Continuation of application No. 15/734,508, filed as application No. PCT/US2019/067410 on Dec. 19, 2019, now Pat. No. 12,050,067.

(Continued)

(51) Int. Cl.
*F28F 19/00* (2006.01)
*B32B 1/08* (2006.01)
(Continued)

(52) U.S. Cl.
CPC .............. *F28F 19/004* (2013.01); *B32B 1/08* (2013.01); *B32B 15/016* (2013.01); *F28F 1/30* (2013.01);
(Continued)

(58) Field of Classification Search
CPC .. F28F 19/004; F28F 1/30; F28F 19/06; F28F 21/084; F28F 2215/04; F28F 2255/00;
(Continued)

(56) References Cited

U.S. PATENT DOCUMENTS 3,859,058 A 1/1975 Anthony et al.
4,196,262 A 4/1980 Pryor et al.
(Continued)

FOREIGN PATENT DOCUMENTS

EP 1391679 A2 2/2004
JP 2001221593 A 8/2001
(Continued)

OTHER PUBLICATIONS

International Search Report for International Application No. PCT/US2019/067410; Application Filing Date: Dec. 19, 2019; Date of Mailing: Mar. 24, 2020; 6 pages.
(Continued)

*Primary Examiner* — Raheena R Malik
(74) *Attorney, Agent, or Firm* — CANTOR COLBURN LLP

(57) ABSTRACT

A heat exchanger is disclosed. The heat exchanger includes a hollow tube extending from a tube inlet to a tube outlet. The hollow tube includes a wall that includes a core of a first aluminum alloy, and a cladding over the core of a second aluminum alloy. The second aluminum alloy is less noble than the first aluminum alloy and includes an alloying element selected from tin, indium, or gallium, or combinations thereof. A first fluid flow path is disposed along an (Continued)

inner surface of the wall from the tube inlet to the tube outlet, and a second fluid flow path is disposed across an outer surface of the wall.

18 Claims, 6 Drawing Sheets

Related U.S. Application Data

(60) Provisional application No. 62/781,951, filed on Dec. 19, 2018.

(51) Int. Cl.

| | |
|---|---|
| *B32B 15/01* | (2006.01) |
| *F28F 1/30* | (2006.01) |
| *F28F 19/06* | (2006.01) |
| *F28F 21/08* | (2006.01) |
| *B23K 20/04* | (2006.01) |
| *C22C 21/06* | (2006.01) |
| *C22C 21/10* | (2006.01) |

(52) U.S. Cl.
CPC ............ *F28F 19/06* (2013.01); *F28F 21/084* (2013.01); *B23K 20/04* (2013.01); *C22C 21/06* (2013.01); *C22C 21/10* (2013.01); *F28F 2215/04* (2013.01); *F28F 2255/00* (2013.01); *F28F 2260/02* (2013.01)

(58) Field of Classification Search
CPC ...... F28F 2260/02; B32B 1/08; B32B 15/016; B23K 20/04; C22C 21/06; C22C 21/10
See application file for complete search history.

(56) References Cited

U.S. PATENT DOCUMENTS

| | | | |
|---|---|---|---|
| 4,632,885 A | | 12/1986 | Tanabe et al. |
| 6,316,126 B1 * | | 11/2001 | Hasegawa ............. F28F 21/089 |
| | | | 138/143 |
| 6,329,075 B1 | | 12/2001 | Nener et al. |
| 6,568,584 B2 | | 5/2003 | Wittebrood et al. |
| 6,796,484 B2 | | 9/2004 | Wittebrood et al. |
| 6,921,584 B2 | | 7/2005 | Syslak et al. |
| 7,000,823 B2 | | 2/2006 | Dockus et al. |
| 7,041,385 B2 | | 5/2006 | Wittebrood |
| 8,349,470 B2 | | 1/2013 | Marois et al. |
| 9,096,916 B2 | | 8/2015 | Norgren et al. |
| 9,790,599 B2 | | 10/2017 | Mrotzek et al. |
| 10,006,724 B2 | | 6/2018 | Perrier et al. |
| 2010/0112370 A1 | | 5/2010 | Ueda |
| 2010/0159272 A1 | | 6/2010 | Marois et al. |
| 2010/0291400 A1 * | | 11/2010 | Ahl ...................... B32B 15/016 |
| | | | 428/576 |
| 2013/0098591 A1 * | | 4/2013 | Taras ........................ F28F 1/10 |
| | | | 165/181 |
| 2013/0302642 A1 | | 11/2013 | Ren |
| 2015/0203934 A1 | | 7/2015 | Oskarsson et al. |
| 2016/0014929 A1 | | 1/2016 | Jaworowki |
| 2017/0182602 A1 | | 6/2017 | Matsumoto et al. |
| 2019/0186655 A1 | | 6/2019 | Ide et al. |
| 2021/0348859 A1 | | 11/2021 | Lombardo et al. |

FOREIGN PATENT DOCUMENTS

| | | |
|---|---|---|
| JP | 2005314774 A | 11/2005 |
| WO | 9817841 A1 | 4/1998 |
| WO | 2014134479 A2 | 9/2014 |
| WO | 2016100640 A1 | 6/2016 |

OTHER PUBLICATIONS

Written Opinion for International Application No. PCT/US2019/067410; Application Filing Date: Dec. 19, 2019; Date of Mailing: Mar. 24, 2020; 7 pages.

* cited by examiner

HEAT EXCHANGER WITH ALUMINUM ALLOY CLAD TUBE AND METHOD OF MANUFACTURE

CROSS REFERENCE TO RELATED APPLICATIONS

This application is a continuation application of application Ser. No. 15/734,508, filed Dec. 2, 2020, which is a National Stage application of PCT/US2019/067410, filed Dec. 19, 2019, which claims the benefit of U.S. Provisional Application No. 62/781,951, filed Dec. 19, 2018, all of which are incorporated by reference in their entirety herein.

BACKGROUND

Exemplary embodiments pertain to the art of heat exchangers and, more specifically, to aluminum alloy heat exchangers.

Heat exchangers are widely used in various applications, including but not limited to heating and cooling systems including fan coil units, heating and cooling in various industrial and chemical processes, heat recovery systems, and the like, to name a few. Many heat exchangers for transferring heat from one fluid to another fluid utilize one or more tubes through which one fluid flows while a second fluid flows around the tubes. Heat from one of the fluids is transferred to the other fluid by conduction through the tube walls. Many configurations also utilize fins in thermally conductive contact with the outside of the tube(s) to provide increased surface area across which heat can be transferred between the fluids, improve heat transfer characteristics of the second fluid flowing through the heat exchanger and enhance structural rigidity of the heat exchanger. Such heat exchangers include microchannel heat exchangers and round tube plate fin (RTPF) heat exchangers.

Heat exchanger tubes may be made from a variety of materials, including metals such as aluminum or copper and alloys thereof. Aluminum alloys are lightweight, have a high specific strength and high thermal conductivity. Due to these excellent mechanical properties, aluminum alloys are used to manufacture heat exchangers for heating or cooling systems in commercial, industrial, residential, transport, refrigeration, and marine applications. However, aluminum alloy heat exchangers can be susceptible to corrosion. Corrosion eventually leads to a loss of refrigerant from the tubes and failure of the heating or cooling system. Sudden tube failure results in a rapid loss of cooling and loss of functionality of the heating or cooling system and can create an environmental problem due to release of refrigerant to the atmosphere. Many different approaches have been tried with regard to mitigating corrosion and its effects; however, corrosion continues to be a seemingly never-ending problem that needs to be addressed.

BRIEF DESCRIPTION

A heat exchanger is disclosed. The heat exchanger includes a hollow tube extending from a tube inlet to a tube outlet. The hollow tube includes a wall that includes a core comprising a first aluminum alloy, and a cladding over the core comprising a second aluminum alloy. The second aluminum alloy is less noble than the first aluminum alloy and includes an alloying element selected from tin, indium, or gallium, or combinations thereof. A first fluid flow path is disposed along an inner surface of the wall from the tube inlet to the tube outlet, and a second fluid flow path is disposed across an outer surface of the wall.

In some embodiments, the cladding can be disposed on an outer surface of the wall.

In any one or combination of the foregoing embodiments, the cladding can be disposed on an inner surface of the wall.

In any one or combination of the foregoing embodiments, the wall can be arranged as a hollow cylinder around the first fluid flow path.

In any one or combination of the foregoing embodiments, the heat exchanger can further comprise a fin comprising a third aluminum alloy extending outwardly from an outer surface of the wall.

In any one or combination of the foregoing embodiments, the fin can be arranged as a plate that includes an opening through which the hollow tube is disposed.

In any one or combination of the foregoing embodiments, the heat exchanger can comprise a plurality of fins disposed along the axis of the hollow tube, extending radially from the hollow tube.

In any one or combination of the foregoing embodiments, the heat exchanger can comprise a plurality of hollow tubes or a plurality of hollow tube sections extending parallel to said axis.

In any one or combination of the foregoing embodiments with plate fins and a plurality of hollow tubes, the plurality of hollow tubes or hollow tube sections can extend through a plurality of openings in said plate or plates.

In any one or combination of the foregoing embodiments, the second alloy can further comprise zinc or magnesium.

Also disclosed is a heat transfer system comprising a heat transfer fluid circulation loop in operative thermal communication with a heat source and a heat sink, wherein the heat exchanger of any one or combination of the foregoing embodiments is disposed as a thermal transfer link between the heat transfer fluid and the heat sink or heat source.

In some embodiments the heat transfer fluid circulation loop can be in operative fluid communication with the first fluid flow path.

Also disclosed is a heat transfer system comprising a heat transfer fluid circulation loop in operative thermal communication with an indoor conditioned air space and an outdoor air space, including a heat exchanger that includes a wall separating an air flow path on a first side of the wall in operative fluid communication the indoor conditioned air space or the outdoor air space, and heat transfer fluid flow path on a second side of the wall in operative fluid communication with the heat transfer fluid circulation loop, wherein the wall includes a core comprising a first aluminum alloy, and a cladding over the core on the first side of the wall comprising a second aluminum alloy, wherein the second aluminum alloy is less noble than the first aluminum alloy and comprises an alloying element selected from tin, indium, or gallium, or combinations thereof.

In some embodiments, the heat transfer system air flow path can be in operative fluid communication with the outdoor air space.

In any one or combination of the foregoing embodiments, the heat transfer air flow path can be in operative fluid communication with the indoor conditioned air space.

Also disclosed is a method of making a heat exchanger. According to the method, a sheet is fabricated that includes a core layer comprising a first aluminum alloy, and a cladding layer that comprises a second aluminum alloy. The second aluminum alloy is less noble than the first aluminum alloy and comprises an alloying element selected from tin, indium, or gallium, or combinations thereof. The sheet is formed into a fluid guide comprising a first fluid flow path in operative fluid communication with a first surface of the fluid guide and a second fluid flow path in operative fluid communication with a second surface of the fluid guide.

In some embodiments, the method further can include attaching one or more fins to the first or second surface of the fluid guide.

In any one or combination of the foregoing embodiments, the sheet can be fabricated by roll pressing the core and cladding layers together.

In any one or combination of the foregoing embodiments, the sheet can be formed and welded to form the fluid guide configured as a cylindrical tube.

In any one or combination of the foregoing embodiments, the sheet can be folded to form a fluid guide configured as a folded microchannel heat exchanger.

In any one or combination of the foregoing embodiments, the method can further include forming a fluid turbulence-promoting surface feature on a surface of the sheet.

In any one or combination of the foregoing embodiments, the method of making a heat exchanger can produce a heat exchanger according to any one or combination of the foregoing heat exchanger embodiments.

Also disclosed is a method of making a heat transfer system, including making a heat exchanger according to any one or combination of the foregoing heat embodiments, disposing the first fluid flow path in operative fluid communication with a heat source, and disposing the second fluid flow path in operative fluid communication with a heat sink.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
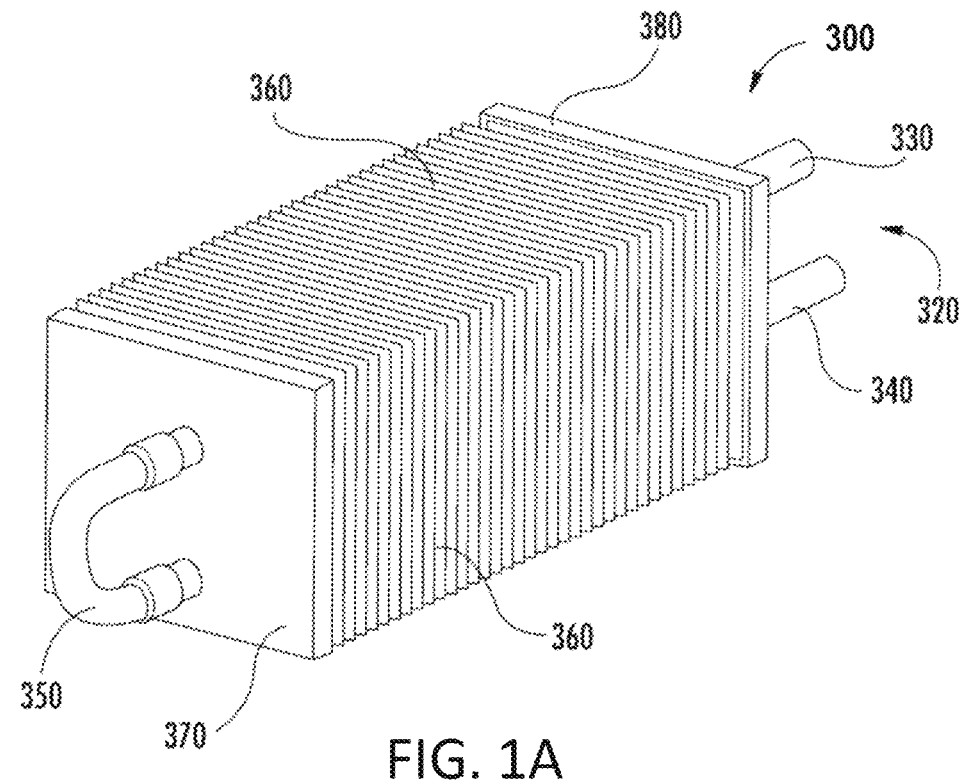
FIGS. 1A, 1B, and 1C show a perspective view of portions of a round tube plate fin heat exchanger.
Figure 1B:
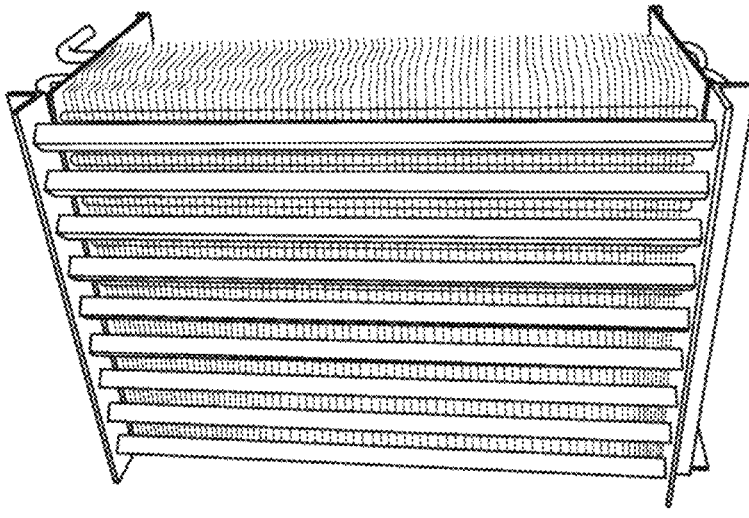
Figure 1C:
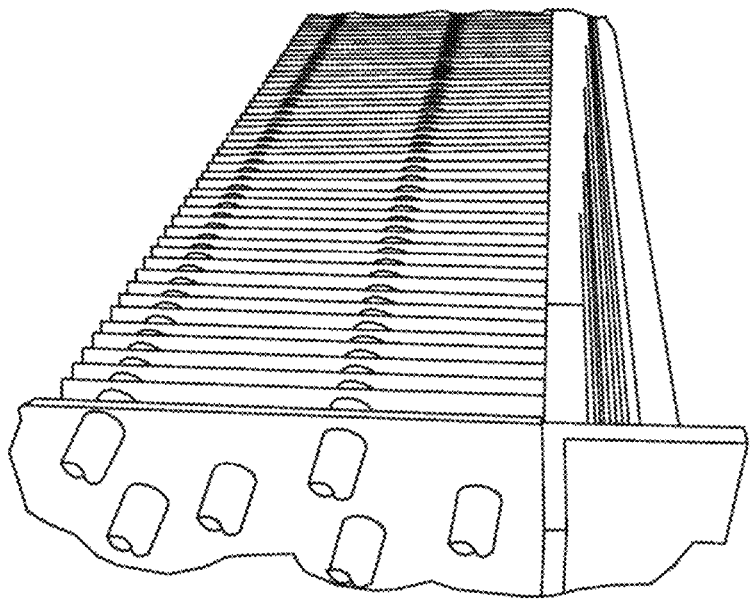

Referring now to FIGS. 1A-1C, an exemplary round tube plate fin (RTPF) heat exchanger 300 is shown. As shown in FIGS. 1A-1C, a heat exchanger 300 can include one or more flow circuits for carrying refrigerant. For the purposes of explanation, a portion of the heat exchanger 300 is shown with a single flow circuit refrigerant tube 320 in FIG. 1A consisting of an inlet line 330 and an outlet line 340. The inlet line 330 is connected to the outlet line 340 at one end of the heat exchanger 300 through a 90 degree tube bend 350. It should be evident, however, that more circuits may be added to the unit depending upon the demands of the system as shown in FIGS. 1B and 1C. For example, although tube bend 350 is shown as a separate component connecting two straight tube section, the tube 320 can also be formed as a single tube piece with a hairpin section therein for the tube bend 350, and multiple units of such hairpin tubes can be connected with u-shaped connectors at the open ends to form a continuous longer flow path in a 'back-and-forth' configuration. Alternatively, the tubes can be configured as separate tube segments in parallel between headers on each end (not shown). The heat exchanger 300 further includes a series of fins 360 comprising radially disposed plate-like elements spaced along the length of the flow circuit, typically connected to the tube(s) 320 with an interference fit. The fins 360 are provided between a pair of end plates or tube sheets 370 and 380 and are supported by the lines 330, 340 in order to define a gas flow passage through which conditioned air passes over the refrigerant tube 320 and between the spaced fins 360. Fins 360 may include heat transfer enhancement elements such as louvers.

Figure 2:
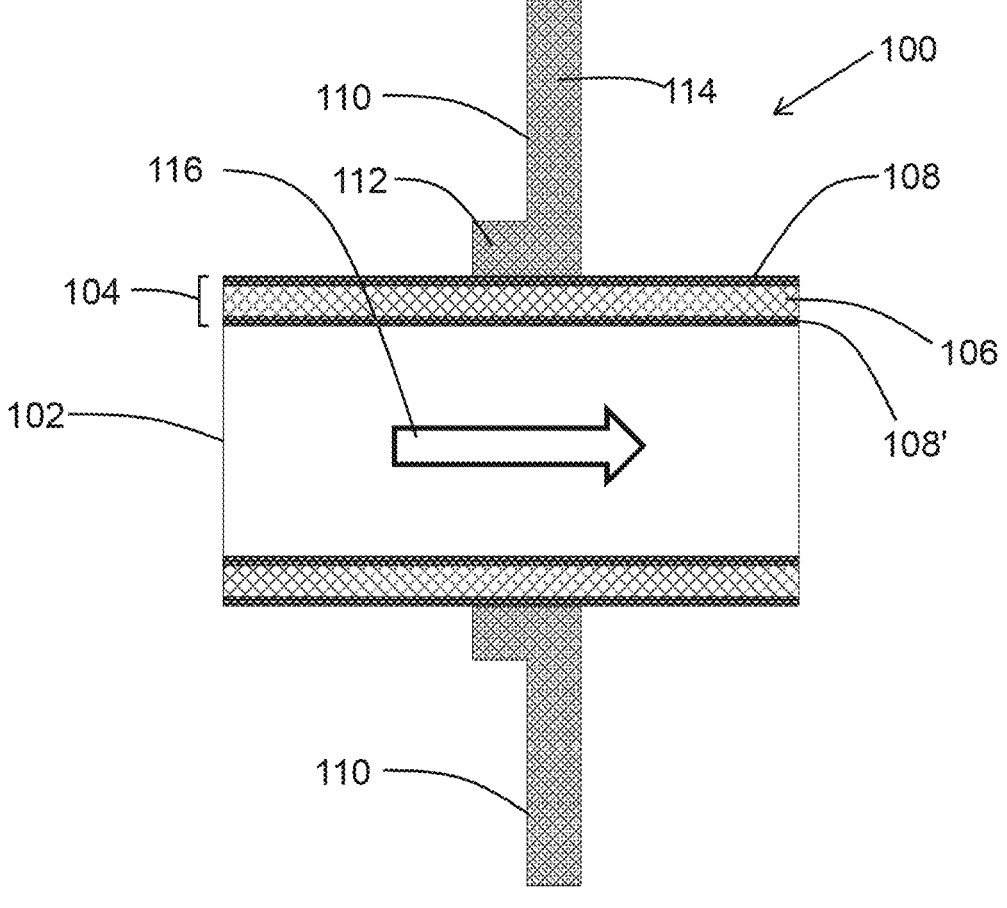
FIG. 2 is a cross-sectional view of a tube and fin assembly.

With reference now to FIG. 2, a tube-fin assembly 100 is shown in a cross-sectional view. As shown in FIG. 2, a hollow tube 102 is formed by a cylindrical wall 104 with a core 106 comprising a first aluminum alloy and cladding 108/108' comprising a second aluminum alloy over the core 106. In some embodiments, the cladding can be disposed on an inner portion of the tube wall 104 (e.g., cladding 108'). In some embodiments, the cladding can be disposed on an outer portion of the tube wall 104 (e.g., cladding 108). In some embodiments, the cladding can be disposed on an inner portion of the tube wall 104 (e.g., cladding 108'), and on an outer portion of the tube wall 104 (e.g., cladding 108). In some embodiments, the hollow tube 102 is round (i.e., a hollow cylinder) as shown in FIG. 2. In other embodiments, the hollow tube cross-section can be have different shapes, e.g., square, rectangular, oval, etc. A fin is shown in thermal contact with the tube in the form of a fin plate 110 shown disposed around the hollow tube 102. The fin plate 110 includes a collar portion 112 that engages with the tube 102 outer surface, and a fin extension portion 114 that extends radially from the tube 102. A flow path 116 for a heat transfer fluid extends through the inside of the hollow tube 102.

The tube wall 104 can have a thickness in a range with a lower end of 0.06 inches and an upper end of 0.035 inches The cladding (108 or 108') can have a thickness in a range with a lower end of 5% of the total wall thickness and an upper end of 25% of the total wall thickness. In some embodiments, the cladding comprising the second aluminum alloy can encase an entire side of the tube wall the fin (e.g., the entire inner surface of the hollow tube, and/or the entire outer surface of the hollow tube), including as shown in FIG. 2. In some embodiments, the cladding comprising the second aluminum alloy can cover a region of the tube wall, but leaves uncovered other portions of the tube wall.

The first metal alloy for the tube core 106 can be an aluminum alloy based material and, in some embodiments, may be made from aluminum alloys selected from 1000 series, 3000 series, 5000 series, or 6000 series aluminum alloys (as used herein, all alloy numbers and alloy series numbers and individual alloy numbers are as specified and published by The Aluminum Association). Examples of aluminum alloys that can be used as core materials include but are not limited to AA3003, AA3004, AA3102, AA3103, or AA5052. Due to the protective nature of subsequent cladding, these alloys can be further modified with additions of iron, silicon and copper to increase strength.

The second metal alloy for the tube cladding 108 can be an aluminum alloy based material and, in some embodiments, may be made from aluminum alloys selected from 1000 series, 3000 series, 5000 series, 6000, or 7000 series aluminum alloys, including but not limited to AA1100, AA1145, AA3003, AA3102, AA5052, AA7072, AA8005, or AA8011. The second aluminum alloy of the outer cladding is less noble, than the first aluminum alloy. By "less noble", it is meant that the second aluminum alloy is galvanically anodic with respect to the first aluminum alloy, i.e., that the second alloy has a lower galvanic potential or a lower electrode potentials than the first aluminum alloy such that the second aluminum alloy would be anodic with respect to the first aluminum alloy in a galvanic cell. This allows the second aluminum alloy to provide sacrificial corrosion protection to the first aluminum alloy. In some embodiments, the difference in galvanic potential between the second aluminum alloy, and the nearest potential of the first aluminum alloy is in a range having a lower end of >0 V, 50 mV, or 150 mV, and an upper end of 400 mV, 650 mV, or 900 mV. These range endpoints can be independently combined to form a number of ranges, and each possible combination is hereby expressly disclosed. In some embodiments, the second aluminum alloy can be provided with reduced nobility by incorporating alloying elements such as zinc or magnesium.

In some embodiments, the second aluminum alloy can be provided with reduced nobility by incorporating alloying elements such as zinc or magnesium. In some embodiments where zinc is present, the zinc can be present in the second aluminum alloy at a level in a range with a lower end of >0 wt. %, 0.8 wt. %, or 4.0 wt. %, zinc and an upper end of 1.3 wt. %, 5.0 wt. %, or 10.0 wt. %. These range endpoints can be independently combined to form a number of ranges, and each possible combination (i.e., 0-1.3 wt. %, 0-5.0 wt. %, 0-10 wt. %, 0.8-1.3 wt. %, 0.8-5.0 wt. %, 0.8-10 wt. %, 4.0-5.0 wt. %, 4.0-10 wt. %, and excluding impossible combinations where a 'lower' endpoint would be greater than an 'upper' endpoint) is hereby expressly disclosed. In some embodiments where magnesium is present, the magnesium can be present in the second aluminum alloy at a level in a range with a lower end of >0 wt. %, 0.05 wt. %, 1.0 wt. %, 1.3 wt. % or 2.2 wt. %, and an upper end of 0.4 wt. %, 1.3 wt. %, 2.8 wt. %, or 4.9 wt. %. These range endpoints can be independently combined to form a number of ranges, and each possible combination is hereby expressly disclosed. The second aluminum alloy also includes one or more alloying elements selected from tin, indium, or gallium. In some embodiments, the selected alloying element(s) can be present in the second aluminum alloy at a level in a range with a lower end of 0.010 wt. %, 0.016 wt. %, or 0.020 wt. %, and an upper end of 0.020 wt. %, 0.035 wt. %, 0.050 wt. %, or 0.100 wt. %. These range endpoints can be independently combined to produce different possible ranges, each of which is hereby explicitly disclosed (i.e., 0.010-0.020 wt. %, 0.010-0.035 wt. %, 0.010-0.050 wt. %, 0.010-0.100 wt. %, 0.016-0.020 wt. %, 0.016-0.035 wt. %, 0.016-0.050 wt. %, 0.016-0.100 wt. %, 0.020-0.020 wt. %, 0.020-0.035 wt. %, 0.020-0.050 wt. %, 0.020-0.100 wt. %). The second alloy can also include one or more other alloying elements for aluminum alloys. The second alloy can also include one or more other alloying elements for aluminum alloys. In some embodiments, the amount of any individual other alloying element can range from 0-1.5 wt. %. In some embodiments, the total content of any such other alloying elements can range from 0-2.5 wt. %. Examples of such alloying elements include Si, Fe, Mn, Cu, Ti, or Cr. In some embodiments, the second aluminum alloy can have a composition consisting of: 4.0-6.0 wt. % zinc or magnesium, 0.01-0.05 wt. % of one or more alloying elements selected from tin, indium, gallium, or combinations thereof, 0-2.5 wt. % other alloying elements, and the balance aluminum.

The third aluminum alloy for the fins 110/360 can include aluminum alloy substrate materials including but not limited to materials selected from the 1000 series, 3000 series, 6000 series, 7000 series, or 8000 series aluminum alloys. The embodiments described herein utilize an aluminum alloy for the fins of a tube-fin heat exchanger having an aluminum alloy tube, i.e., a so-called "all aluminum" heat exchanger. In some embodiments, the fins can be made from or can be overlaid by an aluminum alloy that is galvanically less noble than the first aluminum alloy. In some embodiments, the fins can be made from or can be overlaid by an aluminum alloy that is galvanically less noble than the second aluminum alloy. In some embodiments, all or a portion of the fins 110/360 can include sacrificial aluminum alloy that includes an alloying element selected from tin, indium, or gallium as disclosed in U.S. patent application Ser. No. 62/781,896 filed on Dec. 19, 2018, the disclosure of which is incorporated herein by reference in its entirety.

Figures 3, 4A:
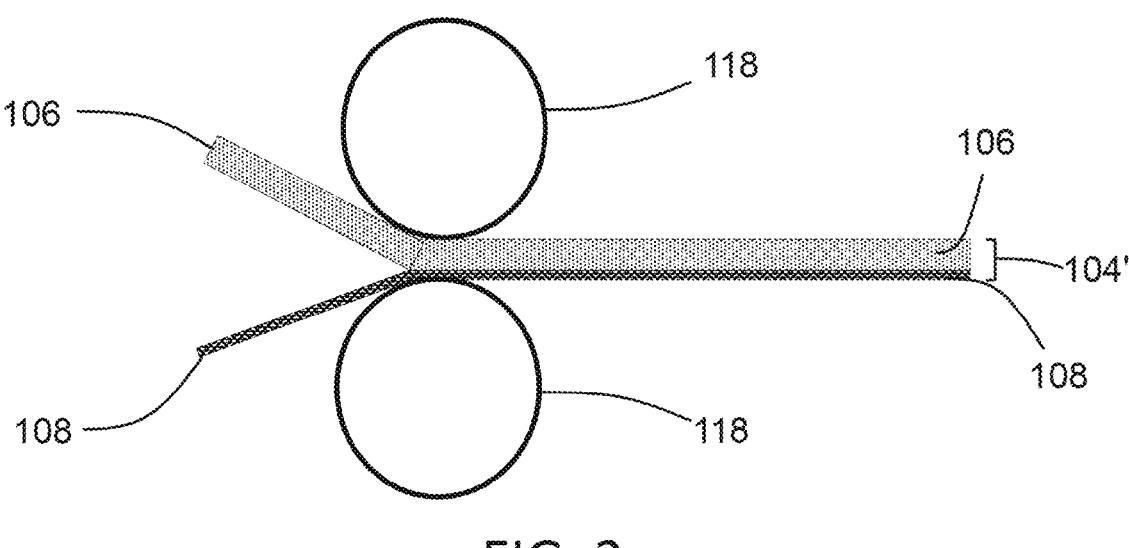
FIG. 3 is a side view showing the formation of a multi-layer aluminum alloy sheet.
FIGS. 4A and 4B schematically show a cross-sectional view of the formation of the sheet of FIG. 4 into a round tube for a heat exchanger.
Figure 4B:
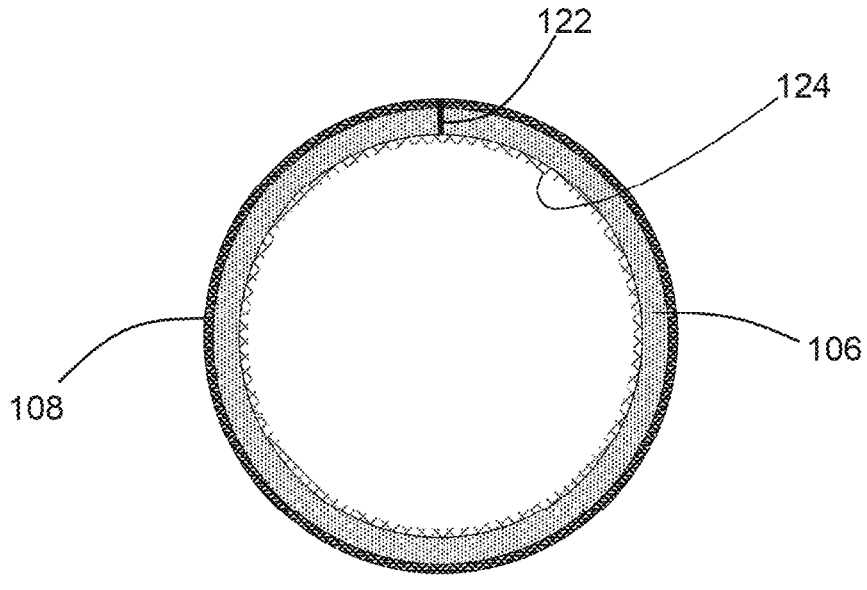

Heat exchanger tubes as described herein can be formed using various techniques, including but not limited to extrusion or pultrusion of the core, with a post-formation application of the cladding (e.g., by thermal spray techniques such as cold spray, or by other application techniques such as electroplating or brazing). Alternatively, the cladding can be co-extruded/pultruded with the core. In some embodiments, the tubes can be formed by first fabricating a composite sheet including the core and the cladding, and then forming that sheet into a tube. An example embodiment is schematically shown in FIGS. 3 and 4A/4B. The sheet can be formed by roll cladding, or other techniques such as post-application of cladding onto a pre-formed aluminum alloy sheet. As shown in FIG. 3, a sheet 104' comprising core 106 and cladding 108 is formed from separate sheets by rolling under heat and pressure applied by rollers 118. As shown in FIG. 4A, a working force 120 is applied to the sheet 104', shown as a cross-section through a direction of tube extension, to form a hollow heat exchanger tube as shown in FIG. 4B, with a cylindrical wall 104. The tube is closed by welding along a scam 122. It should be noted that the layers of the sheet are not limited to the core 106 and cladding 108, and that additional layers can be incorporated on either side of the core 106, e.g., a sacrificial layer (not shown) on the inner surface of the cylindrical wall 104. In some embodiments, such as shown in FIGS. 4A/4B, the inner surface of the cylindrical wall 104 can include a surface feature 124 arranged to promote fluid flow turbulence, which can in turn promote heat transfer at the tube wall/fluid interface. The inclusion of such surface features is facilitated by the above sheet-forming method because embossing and stamping technologies can be more readily employed with the flat sheet 104' compared to an extruded pipe, to provide a variety of surface feature configurations at low cost and high quality.

Figure 5:
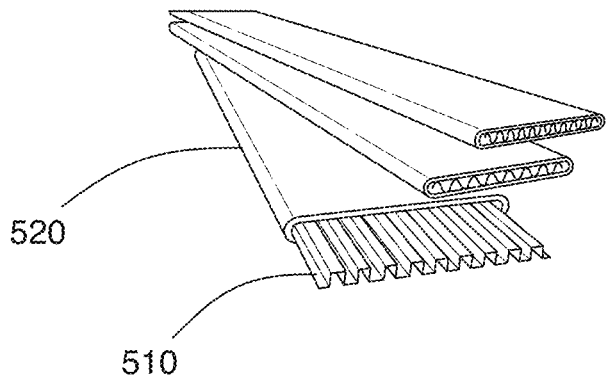
FIG. 5 shows a perspective view of a portion of a folded microchannel heat exchanger, which can be formed by folding the sheet of FIG. 4.

In some embodiments, the sheet 104' can be formed into a heat exchanger fluid guide in a configuration different than the round tube of FIG. 4B. For example, in some embodiments the sheet 104' can be formed into a folded tube heat exchanger configurations, or in a two piece design where the channels are formed using a corrugation form 510 inserted into an outer shell or sleeve 520 as shown in FIG. 5. The corrugated internal sheet can be of different thickness and material than the outer shell altogether (different alloy), or can be made of the same or similar core alloy with an external clad layer of a specific alloy for corrosion resistance in an HVAC system. Configurations and fabrication details for folded tube heat exchangers are disclosed in U.S. Pat. Nos. 4,805,693; 6,209,202; and 7,657,986, the disclosures of each of which is incorporated herein by reference in its entirety.

Figure 6:
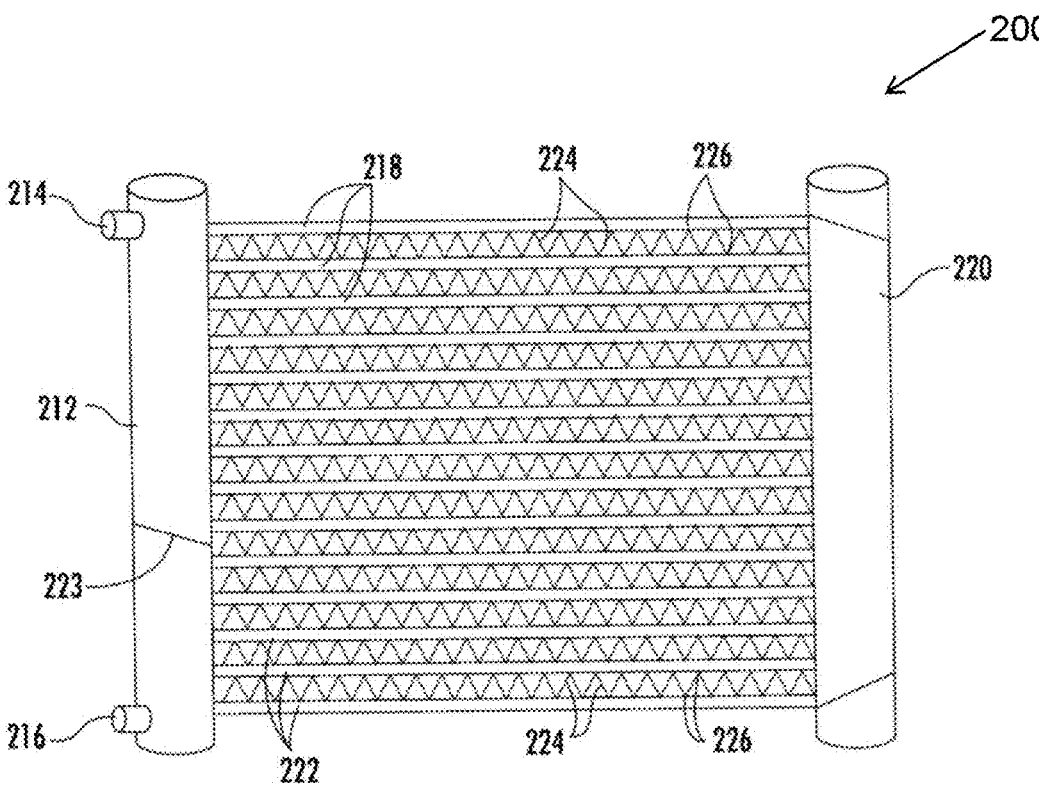
FIG. 6 is a cross-sectional view of a microchannel heat exchanger.

FIG. 6 shows a microchannel or mini-channel heat exchanger 200, which includes first manifold 212 having inlet 214 for receiving a working fluid, such as coolant, and outlet 216 for discharging the working fluid. First manifold 212 is fluidly connected to each of a plurality of tubes 218 that are each fluidly connected on an opposite end with second manifold 220. Second manifold 220 is fluidly connected with each of a plurality of tubes 222 that return the working fluid to first manifold 212 for discharge through outlet 216. Partition 223 is located within first manifold 212 to separate inlet and outlet sections of first manifold 212. Tubes 218 and 222 can include channels, such as micro-channels, for conveying the working fluid. The two-pass working fluid flow configuration described above is only one of many possible design arrangements. Single and other multi-pass fluid flow configurations can be obtained by placing partitions 223, inlet 214 and outlet 216 at specific locations within first manifold 212 and second manifold 220.

With continued reference to FIG. 6, fins 224 are shown extending between tubes 218 and the tubes 222 as shown in the Figure. Fins 224 support tubes 218 and tubes 222 and establish open flow channels between the tubes 218 and tubes 222 (e.g., for airflow) to provide additional heat transfer surfaces and enhance heat transfer characteristics. Fins 224 also provide support to the heat exchanger structure. Fins 224 are bonded to tubes 218 and 222 at brazed joints 226. Fins 224 are not limited to the triangular cross-sections shown in FIG. 6, as other fin configurations (e.g., rectangular, trapezoidal, oval, sinusoidal) can be used as well. Fins 224 may also have louvers to improve heat transfer.

Figure 7:
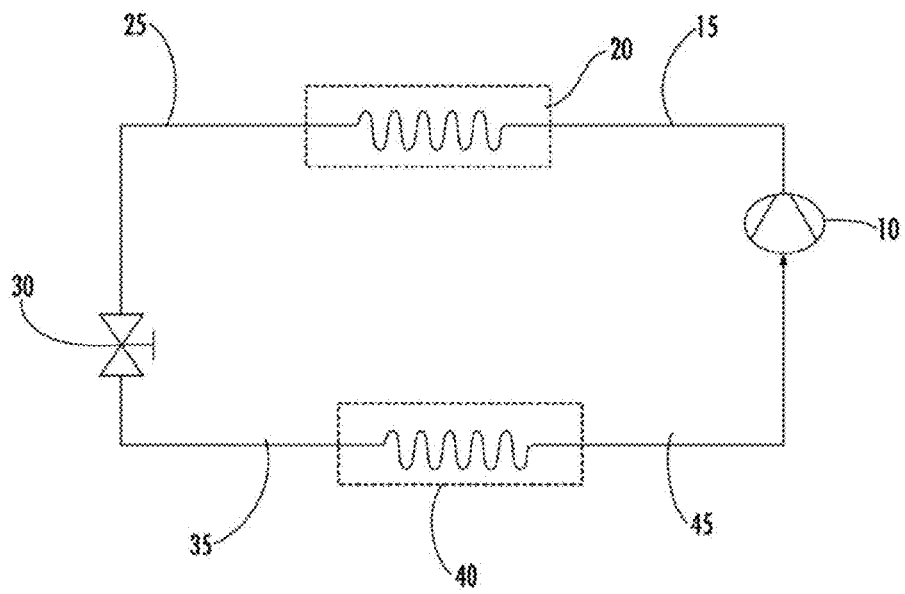
FIG. 7 schematically shows a heat transfer system.

The heat exchanger embodiments disclosed herein can be used in a heat transfer system. Referring now to the FIG. 7, an exemplary heat transfer system with a heat transfer fluid circulation loop is schematically shown in block diagram form. As shown in FIG. 7, a compressor 10 pressurizes a refrigerant or heat transfer fluid in its gaseous state, which both heats the fluid and provides pressure to circulate it throughout the system. The hot pressurized gaseous heat transfer fluid exiting from the compressor 10 flows through conduit 15 to heat rejection heat exchanger 20, which functions as a heat exchanger to transfer heat from the heat transfer fluid to the surrounding environment, resulting in condensation of the hot gaseous heat transfer fluid to a pressurized moderate temperature liquid. The liquid heat transfer fluid exiting from the heat rejection heat exchanger 20 (e.g., a condenser) flows through conduit 25 to expansion valve 30, where the pressure is reduced. The reduced pressure liquid heat transfer fluid exiting the expansion valve 30 flows through conduit 35 to heat absorption heat exchanger 40 (e.g., an evaporator), which functions as a heat exchanger to absorb heat from the surrounding environment and boil the heat transfer fluid. Gaseous heat transfer fluid exiting the heat rejection heat exchanger 40 flows through conduit 45 to the compressor 10, thus completing the heat transfer fluid loop. The heat transfer system has the effect of transferring heat from the environment surrounding the evaporator 40 to the environment surrounding the heat rejection heat exchanger 20. The thermodynamic properties of the heat transfer fluid allow it to reach a high enough temperature when compressed so that it is greater than the environment surrounding the condenser 20, allowing heat to be transferred to the surrounding environment. The thermodynamic properties of the heat transfer fluid must also have a boiling point at its post-expansion pressure that allows the environment surrounding the heat rejection heat exchanger 40 to provide heat at a temperature to vaporize the liquid heat transfer fluid. The heat exchanger embodiments described herein can be used for the heat rejection heat exchanger 20 or the heat absorption exchanger 40.

The heat transfer system shown in FIG. 7 can be used as an air conditioning system, in which the exterior of heat rejection heat exchanger 20 is contacted with air in the surrounding outside environment and the heat absorption heat exchanger 40 is contacted with air in an interior environment to be conditioned. Additionally, as is known in the art, the system can also be operated in heat pump mode using a standard multiport switching valve to reverse heat transfer fluid flow direction and the function of the condensers and evaporators, i.e. the condenser in a cooling mode being evaporator in a heat pump mode and the evaporator in a cooling mode being the condenser in a heat pump mode. Additionally, while the heat transfer system shown in FIG. 7 has evaporation and condensation stages for highly efficient heat transfer, other types of heat transfer fluid loops are contemplated as well, such as fluid loops that do not involve a phase change, for example, multi-loop systems such as commercial refrigeration or air conditioning systems where a non-phase change loop thermally connects one of the heat exchangers in an evaporation/condensation loop like FIG. 7 to a surrounding outside environment or to an interior environment to be conditioned.

To the extent used herein, the term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat transfer system comprising a heat transfer fluid circulation loop in operative thermal communication with an indoor conditioned air space and an outdoor air space, including a heat exchanger that includes a wall separating an air flow path on a first side of the wall in operative fluid communication the indoor conditioned air space or the outdoor air space, and heat transfer fluid flow path on a second side of the wall in operative fluid communication with the heat transfer fluid circulation loop, wherein the wall includes a core comprising a first aluminum alloy, and a cladding over the core on the first side of the wall comprising a second aluminum alloy, wherein the second aluminum alloy is less noble than the first aluminum alloy and comprises an alloying element selected from tin, indium, or gallium, or combinations thereof, and wherein the second aluminum alloy has a composition consisting of 4.0-6.0 wt. % zinc or magnesium, 0.01-0.05 wt. % of one or more alloying elements selected from tin, indium, gallium, or combinations thereof, 0-2.5 wt. % other alloying elements, and balance aluminum.

2. The heat transfer system of claim 1, wherein the air flow path is in operative fluid communication with the outdoor air space.

3. The heat transfer system of claim 1, wherein the air flow path is in operative fluid communication with the indoor conditioned air space.

4. The heat transfer system of claim 1, wherein the second aluminum alloy further comprises zinc or magnesium.

5. The heat transfer system of claim 1, wherein the heat exchanger comprises:
    a hollow tube extending from a tube inlet to a tube outlet, said hollow tube including the wall;
    a first fluid flow path along an inner surface of the wall from the tube inlet to the tube outlet; and
    a second fluid flow path across an outer surface of the wall.

6. The heat transfer system of claim 5, wherein the cladding is disposed on an outer surface of the wall.

7. The heat transfer system of claim 5, wherein the cladding is disposed on an inner surface of the wall.

8. The heat transfer system of claim 5, wherein the wall is arranged as a hollow cylinder around the first fluid flow path.

9. The heat transfer system of claim 5, further comprising a fin comprising a third aluminum alloy extending outwardly from an outer surface of the wall.

10. The heat transfer system of claim 9, wherein the fin is arranged as a plate that includes an opening through which the hollow tube is disposed.

11. The heat transfer system of claim 10, comprising a plurality of fins disposed along an axis of the hollow tube, extending radially from the hollow tube.

12. The heat transfer system of claim 11, comprising a plurality of hollow tubes or a plurality of hollow tube sections extending parallel to said axis.

13. The heat transfer system of claim 12, wherein the plurality of hollow tubes or hollow tube sections extend through a plurality of openings in said plate or plates.

14. A method of making the heat transfer system of claim 5, comprising
    fabricating a sheet that includes a core layer comprising the first aluminum alloy, and a cladding layer that comprises the second aluminum alloy; and
    forming the sheet into a fluid guide comprising the first fluid flow path in operative fluid communication with a first surface of the fluid guide and the second fluid flow path in operative fluid communication with a second surface of the fluid guide.

15. The method of claim 14, further comprising attaching one or more fins to the first or second surface of the fluid guide.

16. The method of claim 14, wherein the sheet is fabricated by roll pressing the core and cladding layers together.

17. A heat transfer system comprising a heat transfer fluid circulation loop in operative thermal communication with an indoor conditioned air space and an outdoor air space, including a heat exchanger that includes a wall separating an air flow path on a first side of the wall in operative fluid communication the indoor conditioned air space or the outdoor air space, and heat transfer fluid flow path on a second side of the wall in operative fluid communication with the heat transfer fluid circulation loop, wherein the wall includes a core comprising a first aluminum alloy, and a cladding over the core on the first side of the wall comprising a second aluminum alloy, wherein the second aluminum alloy is less noble than the first aluminum alloy and comprises gallium.

18. A heat transfer system comprising a heat transfer fluid circulation loop in operative thermal communication with an indoor conditioned air space and an outdoor air space, including a heat exchanger that includes a wall separating an air flow path on a first side of the wall in operative fluid communication the indoor conditioned air space or the outdoor air space, and heat transfer fluid flow path on a second side of the wall in operative fluid communication with the heat transfer fluid circulation loop, wherein the wall includes a core comprising a first aluminum alloy, and a cladding over the core on the first side of the wall comprising a second aluminum alloy, wherein the second aluminum alloy is less noble than the first aluminum alloy and comprises an alloying element selected from tin, indium, or gallium, or combinations thereof and comprises 4.0-10 wt. % zinc, 1.0-4.9 wt. % magnesium, or a combination thereof, based on a total weight of the second aluminum alloy.

* * * * *